June 22, 1954   F. M. MATHENY   2,681,493
SKIRT FOR PIPE LINING DEVICES
Filed May 12, 1952

INVENTOR
FRANCIS M. MATHENY
BY
Mason & Graham
ATTORNEYS

Patented June 22, 1954

2,681,493

UNITED STATES PATENT OFFICE 2,681,493

SKIRT FOR PIPE LINING DEVICES

Francis M. Matheny, Lynwood, Calif., assignor to Pipe Linings, Inc., a corporation of Delaware Application May 12, 1952, Serial No. 287,297

3 Claims. (Cl. 25—38)

This invention has to do with apparatus for lining pipe in place with cementitious material, particularly apparatus of the type which is pulled through the pipe to spread the lining material, the latter being placed in the pipe ahead of the apparatus.

Pipe lining apparatus of the type referred to commonly includes a trailing skirt section which is flexible and acts to spread the material. The forward end of the apparatus is of smaller cross section than the trailing end to facilitate spreading of the lining material. The diameter of the skirt at the trailing end thereof is such that a desired gap or annular space equivalent to the thickness of the lining desired is left between the skirt and the inner wall of the pipe to be lined.

Great difficulty has been experienced in lining pipe with such devices because of the fact that the pipe is often slightly out of round. For example, the pipe may be dented in places, or as is more commonly the case, the heavy earth load above the pipe often distorts the pipe to a somewhat oval cross-sectional shape. While the lining apparatus heretofore used usually embodies a flexible skirt, a disadvantage of the apparatus has been that it doesn't evenly conform to the shape of the pipe where this is not circular. I am aware that various spring means and other means have been used in an attempt to have the skirt assume the cross-sectional shape of the pipe, but so far as I know, these have not been entirely satisfactory. As a result, it is commonly the case that the lining material is not evenly applied where the pipe is out of round.

It therefore is an object of this invention to provide novel and improved apparatus of the type indicated which overcomes the disadvantages noted above of presently used apparatus and which has certain advantageous features of its own.

A particular object of the invention is to provide a pipe lining device wherein the trailing end of the skirt portion of the device tends to conform to the shape of the pipe being lined.

A further object of the invention is to provide a pipe lining device of the type indicated in which means are provided within the skirt for equalizing a compressive force applied to one portion of the skirt in a radial direction and translating this to outward forces on other sections of the skirt.

Another object of the invention is to provide a simple device composed of but few parts which are durable and relatively easy to fabricate.

These and other objects will be apparent from the drawing and the following description.

Referring to the drawing.

Figure 1:
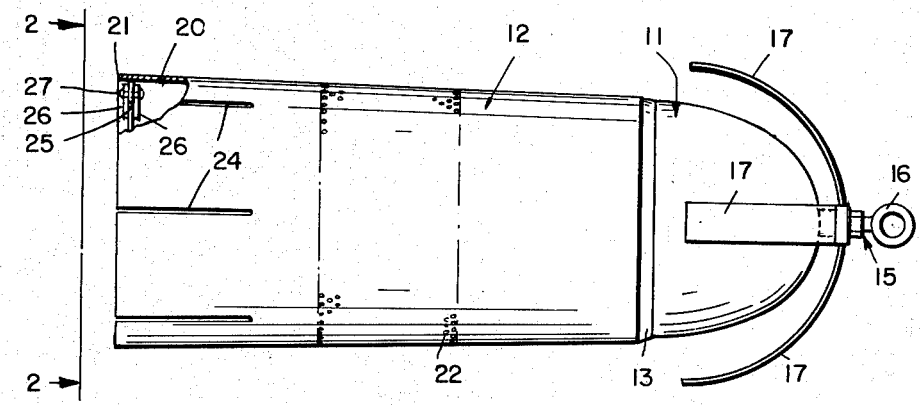
Fig. 1 is a side elevational view of the device embodying the invention, the view being partly broken away.
Figure 2:
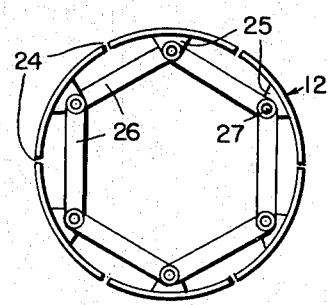
Fig. 2 is an end elevational view of the device of Fig. 1 taken from the direction indicated by line 2—2 of Fig. 1.

More particularly describing the invention, the pipe lining device includes a nose section, generally indicated by 11, and a spreader skirt, generally indicated by 12. These parts are joined at the region 13 and may be rigidly connected by any suitable conventional means. The nose section 11 is provided with an eye or ring bolt assembly 15 which includes a ring bolt 16 which provides a means whereby a cable or other line can be attached for the purpose of pulling the device through a pipe to be lined. The assembly also includes a plurality of centering guide springs 17 which are adapted to ride against the inner surface of the pipe for the purpose of holding the nose or forward section of the device centered in the pipe.

The skirt 12 is hollow and may be formed of a tapering metal wall 20 which has a circular cross section but having a greater diameter at or adjacent its trailing end 21 than at any other region, preferably being tapered gradually to a reduced cross section where it joins the nose 11. At its trailing edge the skirt has a maximum cross-sectional size of the same size as the required finished bore of the pipe when lined. The skirt may be provided with an apertured area 22 containing a plurality of dehydrating openings for passing excess water from the lining material as the device is pulled through the pipe.

Preferably the nose section 11 is somewhat rounded to facilitate the device being pulled through the pipe against the charge of lining material ahead of the device. Customarily the cross-sectional shape of the skirt is circular, since the pipes to be lined are circular. However, I contemplate that where special-shaped, non-circular pipes are to be lined the cross-sectional shape of the skirt would be made to conform to the cross-sectional shape of the particular pipe.

As previously indicated, the skirt is flexible and I may provide slits or narrow slots 24 which extend axially forward of the trailing edge 21 to increase the flexibility. It is a particular feature of my invention that I provide means for insuring the deflection of the cross-sectional shape of the skirt when required to an out-of-round shape to conform to any out-of-round sections of the pipe being lined. I accomplish this by providing a plurality of circumferentially spaced lugs 25 within the skirt and between the slits 24. These are connected by links 26 which are pivotally secured at their ends to adjacent lugs 25 by any suitable connection, as the rivets 27 illustrated.

Figure 3:
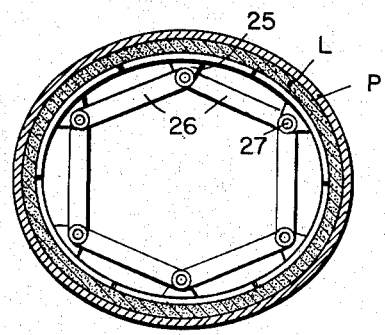
Fig. 3 is a cross-sectional view of a pipe being lined showing the trailing end of the pipe lining device therein and with lining material between the two.

With the construction described, as the device is pulled through a pipe P (Fig. 3) in the lining operation and the lining material L is extruded between the skirt and the pipe, assuming the pipe is out of round as shown in Fig. 3, the upper and lower portions of the skirt will be deflected inwardly with a corresponding outward movement of the side sections of the skirt through the axis of the connecting links 26. Thus where there is any inward movement or deflection of one portion of the skirt, this must be compensated for by an outward deflection of the other portions of the skirt.

Figure 4:
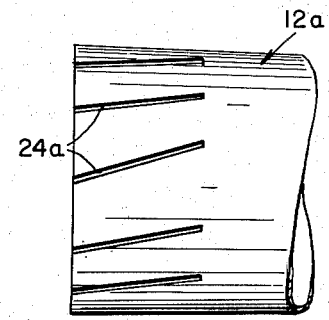
Fig. 4 is a fragmentary side elevational view of another form of skirt.

In Fig. 4 I show a modified form of the invention wherein the skirt, indicated by 12a, has angular slits 24a in place of the slits 24 previously described. Otherwise the construction is the same.

Figure 5:
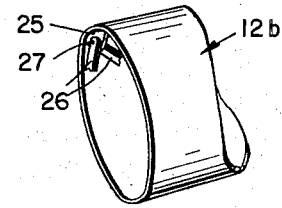
Fig. 5 is a fragmentary perspective view of a modified form of skirt construction.

The linkage structure described can also be embodied in a skirt that does not have slits, such as the skirt 12b shown in Fig. 5.

While I have shown and described preferred forms of my invention, I contemplate that various changes and modifications can be made without departing from the invention, the scope of which is set forth in the claims.

I claim:

1. A device for lining pipe in place with cementitious material, comprising an elongated body having a hollow, flexible spreader skirt at its rearward end, said skirt having a maximum cross section at its trailing end of approximately the same size and configuration as the required finish bore of a pipe when lined, and a plurality of links within said skirt pivotally connected at each of their ends to the skirt at circumferentially spaced regions thereof, said links being substantially in end-to-end relation and with their pivotal axes extending substantially axially of the device.

2. A device as defined in claim 1 in which said skirt is slotted from the trailing edge forwardly a limited distance between the points of pivotal connection of the links and said skirt.

3. A device for lining pipe in place with cementitious material, comprising an elongated body having a hollow, flexible spreader skirt at its rearward end, said skirt having a maximum cross section at its trailing end of the same size and configuration as the required finish bore of a pipe when lined, said skirt having a plurality of flexible sections at the trailing end portion thereof, an inwardly projecting lug on each section, and a plurality of links, said links being fastened at their ends to adjacent lugs, respectively, to pivot thereon about axes extending substantially axially of said device.

References Cited in the file of this patent

UNITED STATES PATENTS

| Number | Name | Date |
| --- | --- | --- |
| 1,103,664 | Draper | July 14, 1914 |
| 2,555,377 | Scott | June 5, 1951 |